United States Patent [19]

Hidehiko et al.

[11] Patent Number: 5,085,109
[45] Date of Patent: Feb. 4, 1992

[54] MACHINE TOOL FOR PROCESSING WORK PIECE INTO NON-CIRCULAR CROSS-SECTIONAL CONFIGURATION

[75] Inventors: Miyake Hidehiko, Okayama; Kajitani Kazuhiro, Kurashiki, both of Japan

[73] Assignee: Takisawa Machine Tool Co., Ltd., Okayama, Japan

[21] Appl. No.: 339,176

[22] Filed: Apr. 14, 1989

[30] Foreign Application Priority Data

Apr. 20, 1988 [JP] Japan .................. 63-99095

[51] Int. Cl.$^5$ .............................................. B23B 3/00
[52] U.S. Cl. ....................................... 82/118; 82/133; 82/134
[58] Field of Search ..................... 82/118 O, 133, 134, 82/137, 123

[56] References Cited

U.S. PATENT DOCUMENTS

| 4,203,062 | 5/1980 | Bathen | 318/571 |
| 4,250,779 | 2/1981 | Feller et al. | 82/118 |
| 4,296,657 | 10/1981 | Yasuba et al. | 82/1.11 |
| 4,653,360 | 3/1987 | Compton | 82/18 |

FOREIGN PATENT DOCUMENTS 61-8202  1/1986  Japan .
61-8203  1/1986  Japan .

Primary Examiner—Bruce M. Kisliuk
Assistant Examiner—Lawrence Cruz
Attorney, Agent, or Firm—Koda and Androlia

[57] ABSTRACT

A machine tool for processing a work piece into a non-circular cross-sectional configuration according to the invention precisely processes, for example, a piston cylinder into a non-circular cross-sectional configuration by inputting simplified data.

That is to say, a tool thereof is moved in a direction (X axis) perpendicular to an axis of the work piece by means of two servo motors. A first X axis servo motor operates to position the tool roughly in the X direction according to the size of the work piece. A second X axis servo motor finely vibrates the tool at high speed on the basis of program data. Since the displacement amount of the second X axis servo motor is fixed by working out the program data of a non-circular cross-sectional contour of the work piece through an automatic operation device, by inputting elements of the work piece in a simplified way and then storing the program data, the invention makes it possible to eliminate the inputting of the data to some extent and to process the work piece precisely and at high speed.

2 Claims, 4 Drawing Sheets

Fig. 4
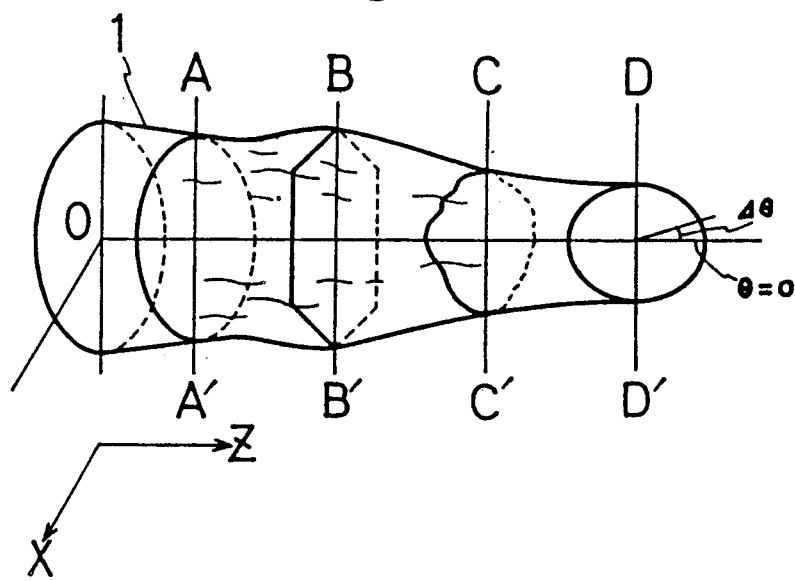
Fig.5(a) Fig.5(b) Fig.5(c) Fig.5(d)
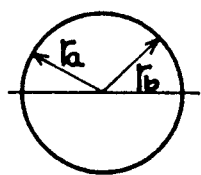 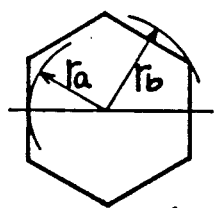 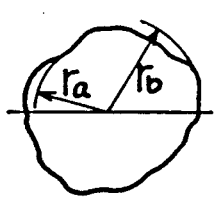 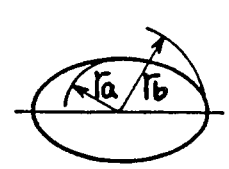
A-A'  B-B'  C-C'  D-D'
$r_a$ = MINIMUM RADIUS   $r_b$ = MAXIMUM RADIUS
Fig. 6
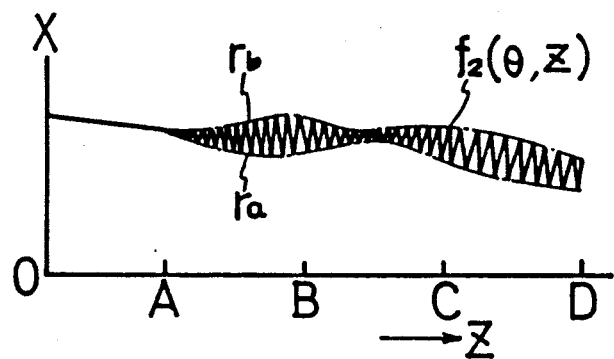

MACHINE TOOL FOR PROCESSING WORK PIECE INTO NON-CIRCULAR CROSS-SECTIONAL CONFIGURATION

BACKGROUND OF THE INVENTION

1. Field of the Invention

This invention relates to a machine tool for precisely processing a work piece into a non-circular cross-sectional configuration by inputting simplified data of such configuration.

2. Prior Art

In a machine tool for processing a work piece into a non-circular cross-sectional configuration, a conventional copying method using a pattern has a disadvantage of having to manufacture the pattern. Accordingly, such a method has recently been investigated that program data of a non-circular cross-sectional contour are worked out on a computer, by inputting the data of the contour, thereby processing the work piece through numerical control.

In the case of processing a work piece into a non-circular cross-sectional configuration, when the work piece or a tool is displaced in the direction (Z direction) parallel to the rotation axis 0, a conventional publicly-known feed screw method and so on can fully cope with the processing of the work piece because it is not necessary to displace the work piece or the tool at any particularly high speed and further a certain speed for displacement can be fixed.

However, recently, since the speeded-up processing of a work piece necessitates rotation at very high speed, it becomes necessary to move the tool not only at high speed but also highly accurately in the X axis direction, that is to say, in the direction perpendicular to the rotation axis 0.

To the above-described need, in Japanese Patent Appln. Laid-Open No. 61-8202, for example, the working fluid of an oil hydraulic cylinder is controlled to reciprocate a tool holder, under the control of a hydraulic servo mechanism. In this method, because the stroke of a single oil hydraulic cylinder becomes so large that a problem arises in the response of the servo system due to inertial force of the moving parts, compressibility of the working fluid and the like, the control system is divided into a main and a sub parts: the main part controls the average diameter of the work piece requiring large movement by means of the conventional feed screw method, and the sub part controls the difference between the minimum and maximum diameters of each cross section of the work piece by means of the oil hydraulic cylinder. Thus, the reciprocative movement of the hydraulic cylinder must be controlled at the center of its stroke, in order to process the work piece more precisely. Accordingly, there has been a disadvantage in that the size of the cylinder tends to be restricted. Further, an instance employing an oil hydraulic servo mechanism is disclosed in Japanese Patent Applh. Laid-Open No. 61-8203.

Such mechanism employing an oil hydraulic servo mechanism has a possibility that, in accordance with an increase in the frequency of the reciprocative movement of the cylinder in the X direction by speeding up the rotation of the work piece, a delay in the phase will occur and the amplitude will decrease. Further, since the oil hydraulic servo mechanism is operated at high speed, the temperature of the working fluid rises and the characteristics change, which results in a deterioration in processing precision because of heat displacement. Further, as the working fluid is compressive, it is influenced by a difference in cutting amount and resistance during cutting caused by the rotational speed of the work piece, which is a primary factor in causing a deterioration in processing precision.

There are other factors which cause a possibility that a delay in the phase will occur and the amplitude will decrease, following an increase in the frequency of the reciprocative movement of the cylinder in the X direction caused by speeding up the rotation of the work piece. Among these are the weight of the tool holder provided in a conventional machine tool, that is, of the slider portion, and a change in the cutting resistance and so on.

There is disclosed in U.S. Pat. No. 4,653,360, an instance employing a linear motor mechanism in place of the above-described oil hydraulic servo mechanism. However, in this instance, because the tool is directly reciprocated in the X direction by the linear motor, the one linear motor bears loads such as the whole weight of the tool holder and the change in the cutting resistance. Thus, this instance has a problem causing the precision during cutting at high speed to deteriorate.

Further, since a cooling device for suppressing production of heat from the linear motor is required, the above instance is not economical.

In addition, the conventional machine tool for processing a work piece into a non-circular cross-sectional configuration has the disadvantage that the data to be input amounting to several tens of thousands of numbers, is difficult to use easily, as in the above publicly-known instance.

SUMMARY OF THE INVENTION

The present invention develops a structure of a machine tool for processing a work piece into a non-circular cross-sectional configuration and a control mechanism for use in this, as shown hereinafter, in order to maintain the precision of processing to extend over the whole stroke of movement of the tool holder, as well as to facilitate input by an operator.

A characteristic of the machine tool for processing a work piece into a non-circular cross-sectional configuration is that, with respect to the work piece (1) being rotated continuously, in the case where a direction parallel to the rotation axis 0 is referred to as a Z axis, a direction perpendicular to the rotation axis an X axis and a rotating direction a C axis, the machine tool comprises a first X axis slider (2) provided relatively movable in the Z and X axis directions, a second X axis slider (3) supported out the first X axis slider (2) which is movable at high speed in the X direction, a second X axis servo motor (5) for moving a tool (4) secured to the second X axis slider (3) in the X axis direction at each position of the Z and rotational directions by a previously programmed command value, a spindle stock (7) including a C axis servo motor (6) for controlling the work piece (1) in the rotational direction, a numerical control device (11) for issuing commands at high speed so as to form a non-circular cross-sectional configuration in the three directions of the Z, C and second X axes, and an automatic operation device (12) for working out controlling program data.

In the invention, the second X axis slider (3) is made of fine ceramic which is light, heat-resistant, non-expansible under heat and is highly wear-resistant, also a high precision ball screw and a servo motor are directly connected to each other. Consequently, according to the invention, the work piece can be processed at higher speed and more precisely.

A control mechanism of the machine tool for processing a work piece in the invention is characterized in that the amount of movement of the second X axis servo motor (5), that is, the command of movement of the tool (4) in the X direction is calculated by finding coordinates at each position on the work piece from a function $f(\theta, Z)$ of a rotation angle $\theta$ from the reference plane of the work piece (1) and a distance Z from the reference point in the Z direction parallel to the rotation axis 0, thereby forming a non-circular cross-sectional contour, and in that program data of the non-circular cross-sectional contour are calculated through the automatic operation device by inputting elements of the work piece in a simplified way, and transmitting them to the numerical control device so as to control the X axis servo motor provided with the tool.

The elements of the work piece described above as easily inputtable are several, such as the distance (given as a dimension value in the drawing) from the reference point existing in the Z axis direction parallel to the rotation axis 0 to a processed configuration showing a reference cross section when the work piece is cut crosswise at an arbitrary position, a configuration of each cross section and so on. In other words, the elements are the minimum local dimension values and enough information to express the non-circular cross-sectional contour.

The program data of the non-circular cross-sectional contour are calculated through the automatic operation device in such a manner that the radii of the contour are firstly operated by interpolated automatic operation through the operation device so that the contour may receive the input cross-sectional configuration and that its configuration may be smooth at arbitrary angles (the configurations cut crosswise passing the axis O) from the reference surface ($\theta = 0$). In this way, the overall area is calculated by the automatic operation device (12) utilizing interpolation, and the data ($P_{01}$, $P_{02}$, $P_{03}$ $P_{A1}$, $P_{A2}$ $P_{c1}$, $P_{c2}$ $P_{ck-1}$, $P_{ck}$), which amount to several tens of thousands of coordinates at the respective points on the work piece, are worked out so that they may be spiral and extend smoothly, considering the movement command of the tool (4) in the X direction as a function $f(\theta, Z)$ of the rotation angle $\theta$ from the reference plane of the work piece (1) and the distance Z from the reference point in the Z direction parallel to the rotation axis 0 according to the processing conditions (speed of rotation, cut-feed and so on).

A large amount of data of the non-circular cross-sectional contour obtained in the above-mentioned manner are stored in a storage on a host computer and the data are stored in an inertial storage on the machine tool, as well. The data are transmitted to the numerical control device at need, controlling the X axis servo motor provided with the tool.

According to such a control method of the machine tool for processing a work piece into a non-circular cross-sectional configuration of the invention, a large amount of data of the non-circular cross-sectional contour are automatically operated solely on the basis of the input of the several elements of the work piece. The X axis servo motor disposed relatively movably in the Z and X directions as well as provided with the tool is controlled on the basis of the above data.

In the machine tool for processing a work piece into a non-circular cross-sectional configuration, of the invention, according to the controlling program data worked out by the automatic operation device (12), the numerical control device (11) issues commands at high speed so as to form a non-circular cross-sectional configuration in the Z, C and second X directions. In this case, first, the first X axis slider (2) rapidly moves relatively in the Z and X directions with respect to the work piece (1) rotated continuously by means of the C axis servo motor (6) for controlling in the rotational direction. Successively, the second X axis slider (3) supported on the first X axis slider (2) moves in the X direction at high speed according to the command value by means of the second X axis servo motor (5).

The first X axis slider operates to position roughly in the X direction according to the size of the work piece and it ordinarily stops during processing of the work piece. The second X axis slider (3) is made of fine ceramic, and when the second X axis servo motor (5) moves the second X axis slider (3) in the X axis direction at high speed in accordance with the command value, the second X axis slider can be moved securely because a highly precise ball screw is directly connected to the servo motor. Further, since the coefficient of heat expansion of fine ceramic is one fifth that of steel, highly precise processing can be carried out stably and for a long period of time.

BRIEF DESCRIPTION OF DRAWINGS

FIG. 4 is an explanatory view of a non-circular cross-sectional work piece to be processed by the invention;

FIGS. 5(a) to 5(d) are cross-sectional views of the non-circular cross-sectional work piece shown in FIG. 4 at the points Z respectively at arbitrary distances from the reference point in the Z direction;

FIG. 6 is an explanatory view showing the control amount of movement of a tool of the machine for processing the work piece;

DETAILED DESCRIPTION OF THE PREFERRED EMBODIMENT

A preferred embodiment of the invention will be described in detail hereinafter with reference to the drawings.

Figure 1:
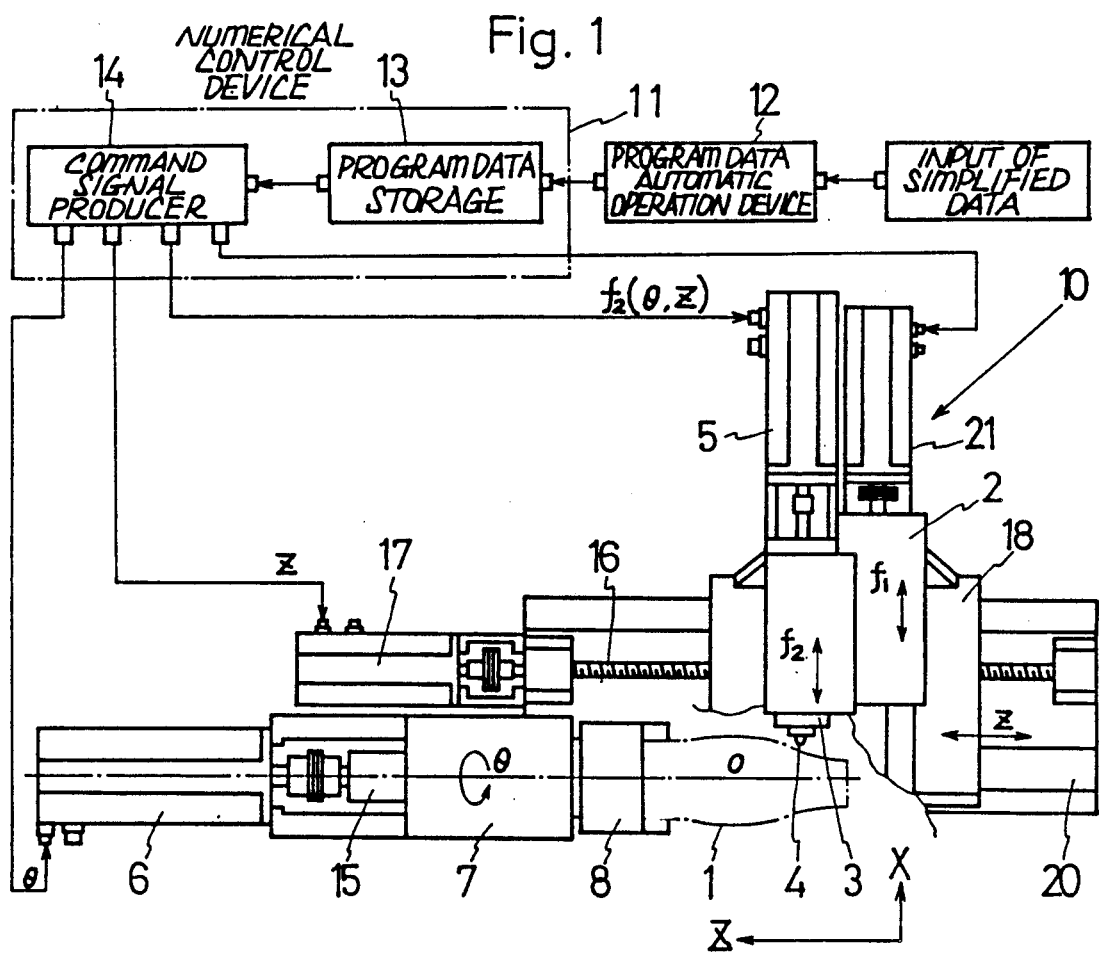
FIG. 1 is a plane view of a machine tool for processing a work piece into a non-circular cross-sectional configuration according to the invention.
Figure 2:
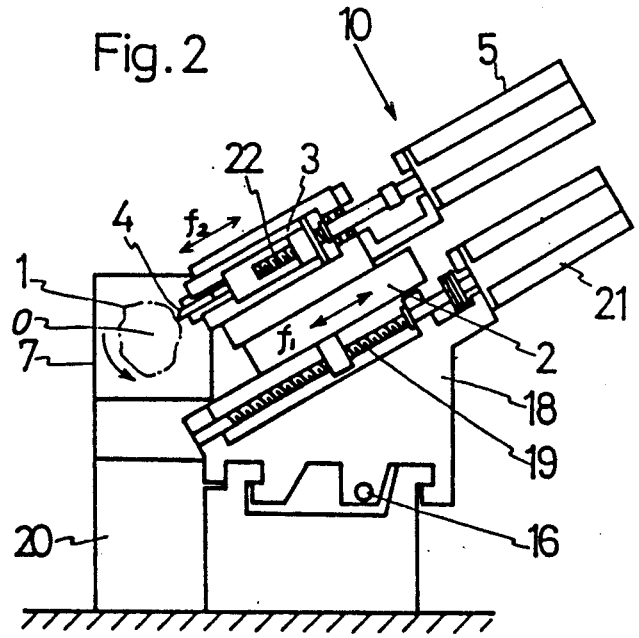
FIG. 2 is a side view of the same, viewed from the right side of the above.
Figure 3:
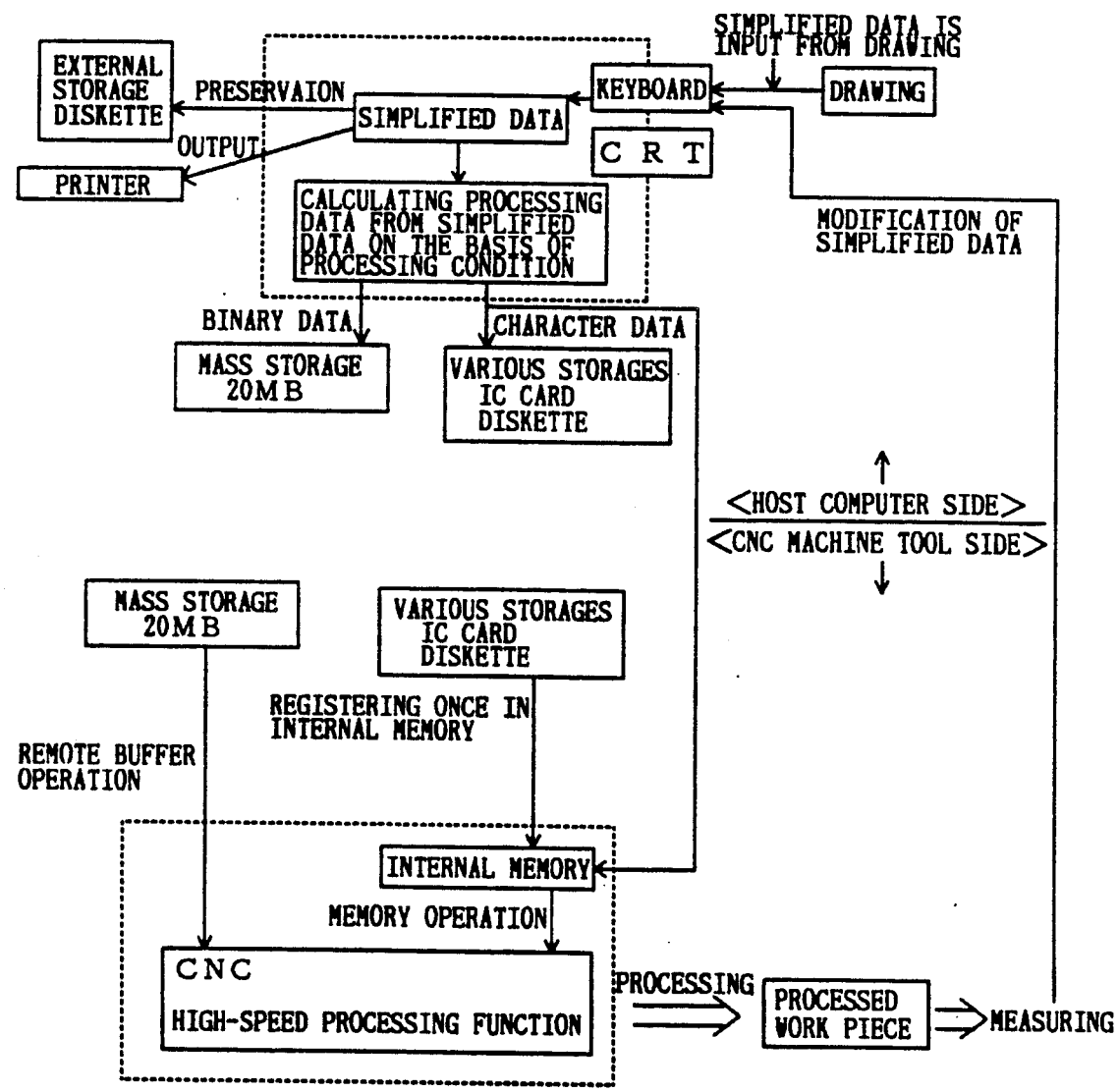
FIG. 3 is a block diagram of the same.

FIG. 1 is a plane view of a machine tool for processing a work piece into a non-circular cross-sectional to the present invention; FIG. 2 is a side view of the same, viewed from the right side thereof; and FIG. 3 is a block diagram of the same.

The machine tool of the invention comprises an automatic operation device (12) in which it is possible to input data in a more simplified way and thus a large amount of data concomitant with a non-circular cross-sectional contour are automatically put into operation; a numerical control device (11) which issues high-speed commands for forming the non-circular cross section in the three directions of an X axis, a C axis and a second X axis on the basis of the data; and a machine tool main body (10).

The automatic operation device (12) mainly utilizes a personal computer, but it is not denied that high-speed data processing could be carried out by means of a large-sized computer. As shown in FIG. 3, the simplified data are input to the automatic operation device (12) from a keyboard or online-input. A large amount of data of the non-circular cross-sectional contour obtained here are transmitted to the next numerical control device (11) and if necessary the data are stored and maintained in a diskette or a cassette by an external storage.

The numerical control device (11) includes a program data storage (13) which stores controlling program data worked out by the automatic operation device (12), and a command signal producer (14) for producing command signals on the basis of the program data.

A spindle stock (7) is provided on a bed (20) of the machine tool main body (10), and a chuck (8) for supporting a work piece (1) is disposed on a spindle (15) rotatably supported on the spindle stock (7). Movement in the rotational direction of the spindle (15) is controlled by a C axis servo motor (6) connected to the spindle through a coupling.

Provided in the Z axis direction parallel to the rotation axis 0 of the spindle (15), there is a Z axis ball screw (16) which is rotated by a Z axis servo motor (17) connected to the end thereof.

A Z axis slider (18) movable in the Z axis direction is fitted on the Z axis ball screw (16), and it is so arranged as to slidably engage with the bed (20) in the Z axis direction.

A first X axis servo motor (21) is provided on the Z axis slider (18) in the X direction. The first X axis servo motor (21) rotates a first X axis ball screw (19) connected to the end thereof. A block-like first X axis slider (2) is engaged with the first X axis ball screw (19) so as to move relatively in the X direction.

The first X axis slider (2) is a main slider, on which a second X axis servo motor (5) is provided in the X axis direction. The second X axis servo motor (5) rotates a second X axis ball screw (22) connected to the end thereof. A block-like second X axis slider (3) which is a sub slider is engaged with the second X axis ball screw (22). The second X axis slider (3) retains a tool (4). In addition, the second X axis slider (3) is made of light but strong fine ceramic, and a highly precise wall screw is utilized for the second X axis ball screw (22).

A method for automatically calculating program data of the non-circular cross-sectional contour and a control method of the machine tool for processing a work piece into a non-circular cross-sectional configuration will now be described in more detail with reference to FIGS. 4 to 8.

Figure 7:
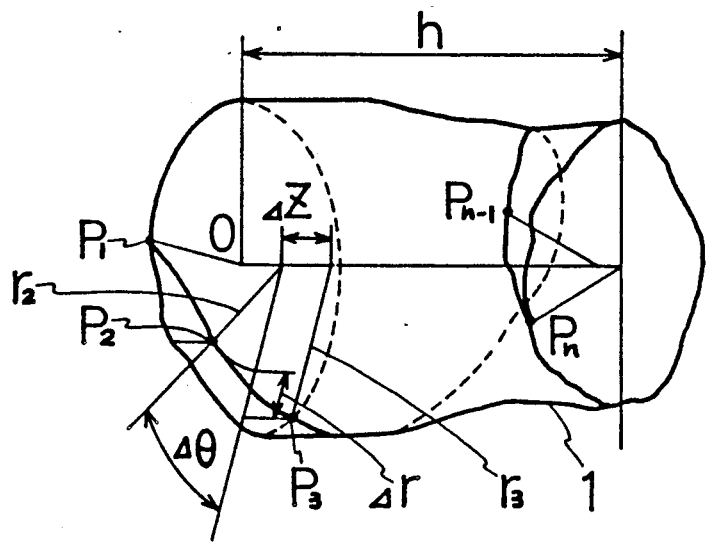
FIG. 7 is an explanatory view of the control amount of movement of each axis during one rotation of the work piece.
Figure 8:
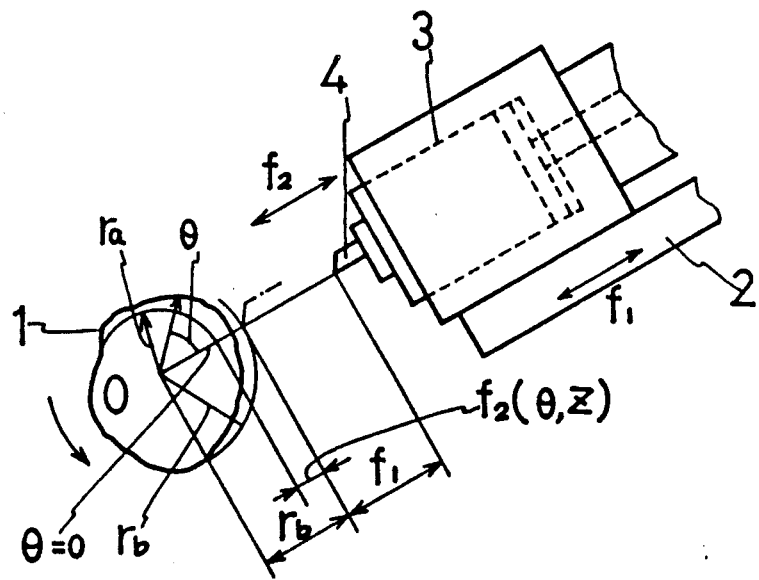
FIG. 8 is a view showing a relation between the control amounts of movements of the first and second X axis sliders and the work piece.

FIG. 4 is an explanatory view of a work piece with a non-circular cross section to be processed by the invention; FIGS. 5(a) to 5(d) are cross-sectional views of the work piece with a non-circular cross section shown in FIG. 4, respectively at a series of points Z at arbitrary distances from the reference point in the Z direction; FIG. 6 is an explanatory view showing the control amount of movement of the tool for processing the work piece; and FIG. 7 is an explanatory view of the control amount of movement of each axis during one rotation of the work piece; and FIG. 8 is a view showing a relation between the control amounts of movements of the first and second X axis sliders and the work piece.

The cross section of the non-circular cross-sectional work piece shown in the drawing is circular between the reference end portion of the work piece and the line A—A', as shown in FIG. 5(a). Therefore, as elements of the work piece, the following are input as data: the minimum radius ra at the reference point 0 and the fact that the cross section there is circular; the distance Z from the reference point 0 to the line A—A' and the fact that the cross section there too is circular; again a minimum radius ra. It is not necessary to input the maximum radius rb because the cross section is circular.

Next, the cross section of the non-circular cross-sectional work piece at the line B—B'. is hexagonal. In this case, the following information is input: the distance Z from the reference point 0 to the line B—B'; the fact that the cross section is hexagonal; the minimum radius ra; and the maximum radius rb.

Similarly, the cross sections at the line C—' and the line D—D' are non-circular and elliptic; the distances from the reference point 0 to the respective lines, the minimum radii ra and the maximum radii rb in the respective cases are all input.

The program data ($P_{01}$, $P_{02}$, $P_{03}$, $P_{ck-1}$, $P_{ck}$) for the smooth non-circular cross-sectional contour from the reference point 0 to the lines A—A', B—B', C—C', D—D' include the input configuration, and the radii are calculated so that the configuration may be smooth in the Z direction at arbitrary angles $\theta$ (configurations cut crosswise passing the axis 0) from the reference plane $\theta=0$. In this case, interpolation is utilized. When coordinates of each point P on the work piece are found by a function $f(\theta, Z)$ of the rotation angle $\theta$ from the reference plane of the work piece (1) and the distance Z from the reference point in the Z direction parallel to the ratation axis 0, the coordinates are established in the data as a spiral locus as in FIG. 7 on the surface of the work piece because the tool is moved at a distance of h during one rotation of the work piece. As for the movement range $\Delta Z$ divided by an extremely small amount, the coordinates of each point ($P_{A2}$, $P_{A3}$ PAJ) except points $P_{A1}$ and $P_{A2}$ which have simplifiedly been input in the data and exsisting therebetween can be found, supposing that the function $f(\theta, Z)$ is a smooth one. In the interpolation, a difference chart is established in the operation device and a conventional publicly-known precise formula of an interpolation function is utilized.

According to this data, the function $(\theta, Z)$ of the distances Z from the reference point in the Z direction is shown in FIG. 6. It is seen that there is an amplitude between the locus of the tool at the point of the maximum radius and the locus of the tool at the point of the minimum radius. The average radius between the maximum and minimum radii is not important in the invention.

FIG. 8 shows the above by the relation between the control amounts of movements of the first and second X axis sliders and the work piece. The first X axis slider (2) shown in the drawing displaces rapidly for the distance of f1 obtained by reducing the value of the maximum radius rb from the distance between the reference point 0 and the distal end of the tool (4) supported by the second X axis slider (3), under the program command, thereby being ready for the processing of the amplitude (f:) between the locus of the tool at the point of the maximum radius and the locus of the tool at the point of the minimum radius by the second X axis slider (3). At this time, it is a matter of course that the position of the edge of the tool (4) with respect to the rotation axis 0 is automatically adjusted at the command of the program. Further, the C axis rotates the C axis servo motor (6) previously shown in FIG. 1 at a certain speed, for controlling the rotation angle $\theta$.

According to the machine tool for processing a work piece into a non-circular cross-sectional configuration of the invention and the control method of the same, a large amount of data of the non-circular cross-sectional contour are automatically operated on the basis of only the input of several elements of the work pieces. The X axis servo motor which is disposed relatively movably in the X and Z axis directions and provided with the tool is controlled on the basis of the above data. Thus, it has become possible to eliminate and speed up the input of the data.

In the machine tool for processing a work piece into a non-circular cross-sectional configuration, in accordance with the controlling program data worked out by the automatic operation device, the numerical control device issues commands at high speed in order to form the work piece into the non-circular cross-sectional configuration in the three directions of the Z axis, C axis and second X axis, the first X axis slider of the main slider relatively rapidly moving the tool in the Z axis and X axis directions with respect to the work piece rotated continuously, and the second X axis slider of the sub slider moving in the X direction to process the work piece at high speed in accordance with the command value, whereby it becomes possible to automatically process the work piece at high speed.

Further, since sliders made of light fine ceramic and precise ball screws are provided in the machine tool, the tool can faithfully follow the command value so that high-speed processing of the work piece has become more precise.

What is claimed is:

1. A machine tool for processing a work piece into a non-circular cross-sectional configuration comprising: a work piece (1) chucked to a main shaft and rotated continuously, a direction parallel to the rotation axis 0 of the work piece is referred to as a Z axis, a direction perpendicular to said rotation axis $\theta$ is an X axis and a rotational direction C is defined about the rotation axis $\theta$;

a Z axis servo motor (17);
    a Z axis slider 18 moved by said Z axis servo motor;
    a first X axis servo motor;
    a first X axis slider (2) moved in said X axis direction by said first X axis servo motor said Z axis slider (18);
    a second X axis servo motor (5);
    a second X axis slider (3) finely movable at high speed on said first X axis slider (2) in the X axis direction by said second X axis servo motor (5);
    a tool (4) secured to said second X axis slider (3);
    said tool (4) being movable back and forth at respective positions in the Z axis and C axis directions by a previously programmed command value;
    a spindle stock (7) including a rotational servo motor (6) for controlling said work piece (1) in the rotational direction; C
    a numeral control device (11) which issues commands of high distributing speed in the three directions of the Z axis, rotational direction C, and second X axis in order to form the work piece into a non-circular cross-sectional configuration; and
    an automatic operation device (12) for determining controlling program data;
    wherein an amount of displacement of the second X axis servo motor (5) which is the movement command of the tool (4) in the X direction is calculated by finding coordinates at each position on the work piece form a function f(0, Z of a rotation angle 0 from a reference plane of the work piece (1) and a distance Z from the reference point in the Z direction parallel to the rotational axis of said work piece, a non-circular cross-sectional contour is determined in the automatic operation device by inputting elements of the work piece in a simplified way by interpolated automatic operation, and the data is transmitted to the numerical control device so as to control the high speed fine movements caused by forward and reverse rotation of said second X axis servo motor provided with the tool.

2. A machine tool for processing a work piece into a non-circular cross-sectional configuration set forth in claim 1, wherein the displacement amount of the second X axis servo motor (5), that is, the movement command of the tool (4) in the X direction is calculated by finding coordinates at each position on the work piece from a function f($\theta$, Z) of a rotation angle $\theta$ from the reference plane of the work piece (1) and a distinct Z from the reference point in the Z direction parallel to the rotation axis 0, to thereby form a non-circular cross-sectional contour; program data of said non-circular cross-sectional contour are worked out in the automatic operation device by inputting elements of the work piece in a simplified way, and the data are transmitted to the numerical control device so as to control the X axis servo motor provided with the tool.

* * * * *